(12) United States Patent
Pavlakovic

(10) Patent No.: US 10,266,331 B2
(45) Date of Patent: Apr. 23, 2019

(54) APPARATUS FOR DISPENSING AN ADHESIVE

(71) Applicant: Anthony Pavlakovic, Vancouver (CA)

(72) Inventor: Anthony Pavlakovic, Vancouver (CA)

( * ) Notice: Subject to any disclaimer, the term of this patent is extended or adjusted under 35 U.S.C. 154(b) by 0 days.

(21) Appl. No.: 15/430,181

(22) Filed: Feb. 10, 2017

(65) Prior Publication Data

US 2017/0225868 A1     Aug. 10, 2017

Related U.S. Application Data

(60) Provisional application No. 62/293,459, filed on Feb. 10, 2016.

(51) Int. Cl.

| | |
|---|---|
| B65D 81/32 | (2006.01) |
| B65D 35/02 | (2006.01) |
| B65D 35/22 | (2006.01) |
| B65D 35/44 | (2006.01) |
| C09J 9/00 | (2006.01) |
| C09J 163/00 | (2006.01) |
| B65D 75/58 | (2006.01) |
| B65D 85/00 | (2006.01) |

(52) U.S. Cl.
CPC ......... *B65D 81/3266* (2013.01); *B65D 35/02* (2013.01); *B65D 35/22* (2013.01); *B65D 35/44* (2013.01); *B65D 75/5866* (2013.01); *B65D 81/3272* (2013.01); *B65D 85/70* (2013.01); *C09J 9/00* (2013.01); *C09J 163/00* (2013.01)

(58) Field of Classification Search
CPC ............ B65D 81/3266; B65D 81/3261; B65D 81/3275; B65D 81/3272; B65D 35/02; B65D 35/22; B65D 35/44; B65D 85/70; B65D 75/5866; C09J 9/00; C09J 163/00
USPC .......................... 222/541.1, 541.3, 541.4, 94
See application file for complete search history.

(56) References Cited

U.S. PATENT DOCUMENTS

| | | | |
|---|---|---|---|
| 3,239,105 A | 3/1966 | Woodson | |
| 3,380,632 A | 4/1968 | Wilson | |
| 3,915,297 A | 10/1975 | Rausch | |
| 4,009,778 A | 3/1977 | Howell | |
| 4,148,417 A | 4/1979 | Simmons | |
| 5,076,464 A | 12/1991 | Simon | |
| 5,425,475 A * | 6/1995 | Clark ..................... | B65D 35/28 222/103 |
| 5,697,524 A | 12/1997 | Sedlmeier | |
| 6,164,822 A | 12/2000 | Beer | |

(Continued)

FOREIGN PATENT DOCUMENTS

DE     2632965 A1 *   1/1978

*Primary Examiner* — Lien Ngo

(57) ABSTRACT

A method and apparatus for dispensing an adhesive having a base component and a hardener component that when mixed produce a curable adhesive is disclosed. The apparatus includes a compliant exterior wall enclosing a first volume for containing the base component and a second volume for containing the hardener component, the first and second volumes being separated by a membrane within the exterior wall. The apparatus also includes a frangible region formed in the exterior wall and being operable to rupture to provide at least one outlet in response to an increase in pressure caused by a force applied to the exterior wall, the at least one outlet permitting respective portions of the base component and the hardener component to be expelled to facilitate mixing of the curable adhesive.

16 Claims, 2 Drawing Sheets

(56) References Cited

U.S. PATENT DOCUMENTS 8,454,882 B2 6/2013 Chan et al.
2012/0292340 A1* 11/2012 Nadon ................ B65D 75/585
222/107

* cited by examiner

APPARATUS FOR DISPENSING AN ADHESIVE

BACKGROUND

1. Field

This disclosure relates generally to dispensing adhesives, and more particularly to dispensing an adhesive having a base component and a hardener component that when mixed produce a curable adhesive.

2. Description of Related Art

Various methods are employed in the art for dispensing two-component adhesives. In the simplest form the components may be stored in separate containers and mixed according to weight or volume as needed. Various other enclosures such as side-by-side syringes having ganged plungers have been used to dispense approximate measures of adhesive components. There remains a need for convenient dispensing of two-component adhesive materials.

U.S. Pat. No. 4,009,778 discloses a dual compartment package in which a film is formed into a tubular member having a first compartment and a second compartment attached to a sidewall of the first compartment. The first compartment is formed within an interior surface of the film by sealing ends of the film together to form an elongate tube. The second compartment is formed by folding the sealed end back over an exterior surface of the film and sealing to the exterior. The first and second compartments may then be filled with adhesive components and clinched off to produce individual elongate tubular packages. The tubular package may be inserted into a hole drilled for a rock bolt, and when the rock bolt is driven into the hole the package is ruptured expelling the adhesive components.

U.S. Pat. No. 3,915,297 discloses a package produced from a film by sealing the ends to form a tube similar to that disclosed in U.S. Pat. No. 4,009,778, but in this case with a single compartment. The adhesive components are introduced into the single compartment such that a polymerized interface is created between components effectively creating a barrier separating the adhesive components. Use of the package for a rock bolt is as described above for the package disclosed in U.S. Pat. No. 4,009,778.

SUMMARY

In accordance with one disclosed aspect there is provided an enclosure apparatus for dispensing an adhesive having a base component and a hardener component that when mixed produce a curable adhesive. The apparatus includes a compliant exterior wall enclosing a first volume for containing the base component and a second volume for containing the hardener component, the first and second volumes being separated by a membrane attached to the exterior wall. The apparatus also includes a frangible region formed in the exterior wall and being operable to rupture to provide at least one outlet in response to an increase in pressure caused by a force applied to the exterior wall, the at least one outlet permitting respective portions of the base component and the hardener component to be expelled to facilitate mixing of the curable adhesive.

The at least one frangible region may include a first frangible region in communication with the first volume and a second frangible region in communication with the second volume, and each of the first and second frangible regions may be configured to rupture to provide respective first and second outlets in response to the force applied to the exterior wall.

The membrane separating the first and second volumes may surround the second frangible region and extend inwardly from the exterior wall, the second frangible region being operable, when ruptured, to provide an outlet for the second volume, and the first frangible region may be disposed outwardly on the exterior wall with respect to the second frangible region and is operable, when ruptured, to provide an outlet for the first volume.

The first frangible region may be sized such that, when ruptured, an extent of the second outlet is limited to a portion of the exterior wall enclosing the second volume.

The second frangible region may include a circular region and the first frangible region may have at least one generally annular shaped portion.

The membrane may be disposed attached to a portion of the exterior wall opposite the frangible region, the membrane being operably configured to rupture in response to the force applied to the exterior wall to permit the hardener component to be expelled into the first volume and through the frangible opening together with the base component.

The at least one frangible region may include a frangible region in communication with the second volume, which when ruptured provides a single outlet and the membrane may be operably configured to rupture in response to the force applied to the exterior wall to permit the base component and the hardener component to be expelled through the single outlet to facilitate mixing of the curable adhesive.

The at least one frangible region may include a thinned region of the exterior wall.

The at least one frangible region may include a scored region of the exterior wall.

The at least one frangible region may include an opening in the exterior wall having a closure for sealing the opening, the closure being operable to be displaced in response to the force being applied to the exterior wall.

The first volume may be substantially greater than the second volume generally in proportion to a mixing ratio for mixing the curable adhesive.

The first volume may be sized to account for a portion of the base component that will remain when the base component and the hardener component have been expelled such that the base component and the hardener component are dispensed in proportions according to a pre-determined mixing ratio.

The exterior wall may include one or more of a gelatin material, a polyvinyl alcohol material, a pullulan polysaccharide polymer material, and a metallic film.

The exterior wall may have a rounded shape.

The exterior wall may have a substantially spherical shape.

The base component may have a high plasticity suitable for use as a filler material when mixed to provide the curable adhesive.

The adhesive may include a two-part filler material putty.

In accordance with another disclosed aspect there is provided a method for dispensing an adhesive having a base component and a hardener component that when mixed produce a curable adhesive. The method involves enclosing the adhesive within a compliant exterior wall having a first volume for containing the base component and a second volume for containing the hardener component, the first and second volumes being separated by a membrane attached to the exterior wall. The method further involves causing a frangible region formed in the exterior wall to rupture to provide at least one outlet in response to an increase in pressure caused by a force applied to the exterior wall, the at least one outlet permitting respective portions of the base component and the hardener component to be expelled to facilitate mixing of the curable adhesive.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
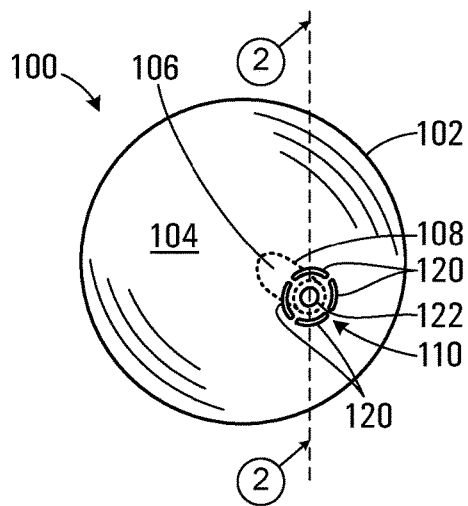
FIG. 1 is a perspective view of an apparatus for dispensing an adhesive in accordance with a first disclosed embodiment.

Referring to FIG. 1, an enclosure apparatus for dispensing an adhesive according to a first disclosed embodiment is shown generally at 100. The adhesive includes a base component and a hardener component that when mixed produce a curable adhesive. The enclosure 100 includes a compliant exterior wall 102, which in one embodiment may be fabricated from a gelatin material. In other embodiments the exterior wall may be a polyvinyl alcohol material, a pullulan polysaccharide polymer material, a compliant metal material such as aluminum film, an aluminum/plastic or other composite material, or other suitable material. The metallic material may be required as a protective layer where there is a reaction between components of the adhesive and the exterior wall.

The exterior wall 102 encloses a first volume 104 for containing the base component and a second volume 106 for containing the hardener component. The first and second volumes 104 and 106 are separated by a membrane 108. In this embodiment the enclosure 100 has a generally spherical shape, but in other embodiments the enclosure may be in the shape of an ellipsoid or oval or other generally rounded shape.

The adhesive may be any two-component formulation such as an epoxy for bonding, a filler material having a high-plasticity base component for filling cracks and other surface defects, a thermosetting epoxy matrix for wetting out a fiber material such as fiberglass, an elastomeric impression material used in dentistry, or any other formulation that is cured by mixing two constituent components for various uses. In one embodiment the adhesive may be a two-part filler material such as Bondo® putty produced by the 3M Company, which is commonly used as an automobile body filler and for several other uses.

The enclosure 100 includes a frangible region 110 formed in the exterior wall 102, which in the embodiment shown includes first and second frangible regions 120 and 122. The second frangible region 122 is operable, when ruptured, to provide an outlet for the second volume 106. The first frangible region 120 is disposed outwardly on the exterior wall 102 with respect to the second frangible region 122 and is operable, when ruptured, to provide an outlet for the first volume 104. In the embodiment shown in FIG. 1, the second frangible region 122 is a generally circular shaped region and the first frangible region 120 includes a plurality of generally annular shaped portions.

In this embodiment, the membrane 108 is attached to an interior surface of the exterior wall 102 surrounding the second frangible region 122 and extends inwardly from the exterior wall. In one embodiment the membrane 108 may be fused to the exterior wall 102 to provide the second volume 106.

Figure 2:
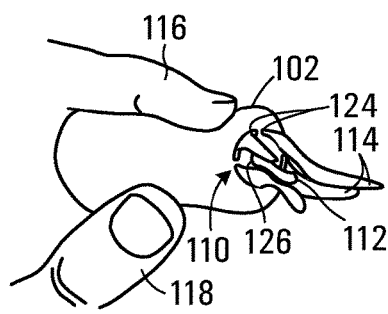
FIG. 2 is a perspective view of the apparatus shown in FIG. 1 in use.

Referring to FIG. 2, the frangible region 110 is operable to rupture in response to a force being applied to the exterior wall 102 to provide at least one outlet that permits respective portions 112 and 114 of the base component and the hardener component to be expelled to facilitate mixing of the curable adhesive. In the embodiment shown the force on the compliant exterior wall 102 is provided by a user grasping the enclosure 100 between a finger 116 and a thumb 118 and squeezing with sufficient force to rupture the frangible region 110. Following rupture of the frangible region 110 the user continues squeezing the compliant exterior wall 102 until a significant portion of the adhesive has been dispensed. In practice, at least some of the adhesive may remain in the enclosure 100 and may be difficult to completely expel through the outlet. In one embodiment, the first volume 104 may be sized to account for a portion of the base component that typically remains after dispensing so that the base and hardener components are dispensed in correct proportions according to a pre-determined mixing ratio for the adhesive. In the embodiment shown, the first volume 104 is substantially greater than the second volume 106 generally in proportion to a mixing ratio for mixing the curable adhesive. In other embodiments the relative size of the volumes 104 and 106 may vary depending on the required mixing ratio.

In the embodiment shown in FIG. 1, the first frangible region 120 is in communication with the first volume 104 and the second frangible region 122 is in communication with the second volume 106. Referring to FIG. 2, the first frangible region 120 is configured to rupture in response to the force applied to the exterior wall 102 to provide first outlets 124 for dispensing the base component. The second frangible region 122 is configured to rupture after the base component has been partially or substantially expelled through the first outlets 124 and the user's finger 116 and thumb 118 apply a pressure on the membrane 108 through the compliant exterior wall 102. The second frangible region 122 then ruptures and the hardener component is dispensed through a second outlet 126.

The adhesive may be dispensed onto a surface for mixing with a spatula or other mixing implement. Alternatively, the adhesive may be dispensed directly onto a work surface to be bonded and/or filled for mixing on the work surface.

Advantageously, the first and second volumes 104 and 106 facilitate dispensing of measured volumes of base and hardener component in accordance with a required mixing ratio. Many two-component adhesives are thermoset plastics, which cure through heat generated by a chemical reaction between the base and the hardener (usually a catalyst). When using such adhesives, too much hardener component will generally cause the cured material to become brittle and/or crack while too little hardener would impede curing. It is therefore important that the dispensed volume of the components be within certain tolerances, which for best performance of some adhesive products may be a fairly narrow range. Conventionally, dispensing is performed by measuring out proportions of hardener component and base component using a measuring cup, scale, or by estimating. In cases where the adhesive product requires a significantly unequal mixing ratio of base to hardener component, estimating may be difficult in practice and errors inevitably occur. The enclosure 100 prevents possible errors by dispensing measured volumes of base and hardener.

The overall volume of the adhesive provided in the enclosure 100 may be selected in accordance with typical tasks associated with an intended use. In general the enclosure 100 is sized to fit within a user's hand as shown in FIG. 2 and operated using one hand, but this is not mandated and larger enclosures may be otherwise handled. In some embodiments a number of different sized enclosures 100 may be produced enclosing different volumes of adhesive, which may reduce potential wastage where smaller or larger volumes of adhesive are required for a particular task.

Figure 3:
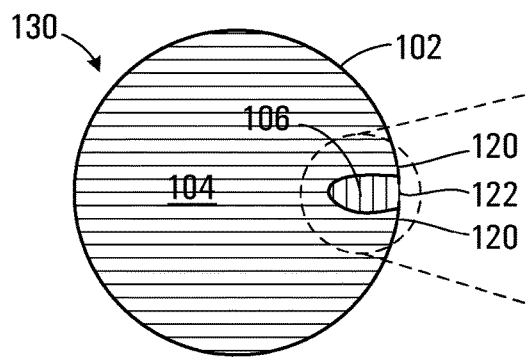
FIG. 3 is a cross sectional view of the apparatus shown in FIG. 1 taken along the line 2-2.
Figure 3:
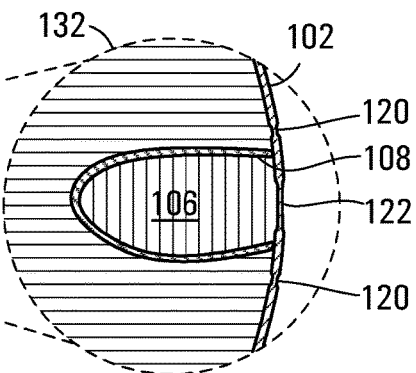

The enclosure 100 is shown in a cross sectional view in FIG. 3 at 130. The cross section is taken along the line 2-2 in FIG. 1. Referring to FIG. 3, in the embodiment shown the first and second frangible regions 120 and 122 are provided by thinned sections of the exterior wall 102. A portion of the exterior wall 102 is shown in larger scale in an insert 132 to better depict the first and second frangible regions 120 and 122. In this embodiment the first and second frangible regions 120 and 122 are thinner than the compliant exterior wall 102 so as to rupture when a force is applied to the exterior wall 102 and the membrane 108.

Figure 4:
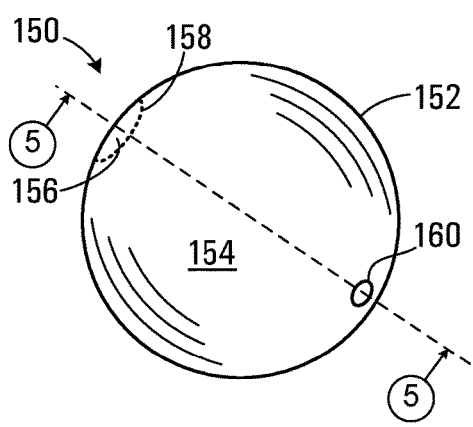
FIG. 4 is a perspective view of an apparatus for dispensing an adhesive in accordance with an alternative disclosed embodiment.
Figure 5:
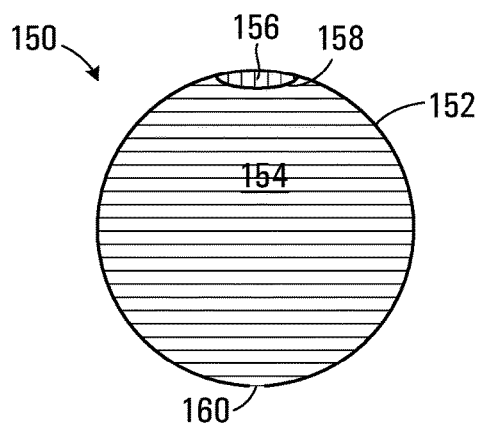
FIG. 5 is a cross sectional view of the apparatus shown in FIG. 4 taken along the line 5-5.

Referring to FIG. 4, an apparatus for dispensing an adhesive according to an alternative disclosed embodiment is shown generally at 150. The apparatus 150 includes a compliant exterior wall 152 enclosing a first volume 154 for holding the base component of an adhesive. A second volume 156 is separated from the first volume 154 by a membrane 158 for holding the hardener component. In this embodiment the apparatus 150 includes a single frangible region 160 in communication with the first volume 154. The apparatus 150 is shown in cross section in FIG. 5. The second volume 156 may be disposed on a portion of the exterior wall 152 generally opposing the frangible region 160 or elsewhere attached to the compliant exterior wall 152. In operation the user squeezes the compliant exterior wall 152 with sufficient force to rupture the frangible region 160 and begin expelling the base component through the opening provided by the ruptured frangible region. The user may simultaneously or subsequently exert a force on the compliant exterior wall 152 proximate the second volume 156, which raises the pressure in the second volume rupturing the membrane 158. In one embodiment the membrane 158 may be sufficiently thin to easily rupture or alternatively the membrane may have a thinned frangible section (not shown) that ruptures in response to the increased pressure in the second volume 156. The hardener component in the second volume 156 may thus partially mix with a remaining base component in the first volume 154 while being expelled through the opening provided by the ruptured frangible region 160.

Figure 6:
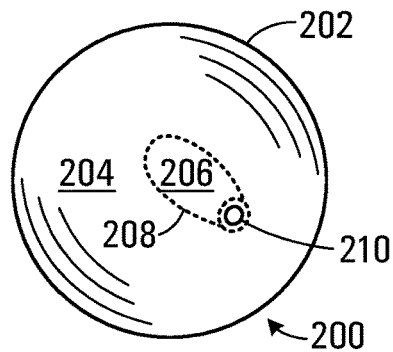
FIG. 6 is a perspective view of an apparatus for dispensing an adhesive in accordance with another disclosed embodiment.

Referring to FIG. 6, an apparatus for dispensing an adhesive according to an alternative disclosed embodiment is shown generally at 200. As in the embodiment shown in FIG. 1, the apparatus 200 includes a compliant exterior wall 202 enclosing first and second volumes 204 and 206 separated by a membrane 208. In this embodiment the apparatus 200 includes a single frangible region 210 in communication with the second volume 206.

The single frangible region 210, when ruptured, provides a single outlet for discharging the adhesive. The membrane 208 is operably configured to rupture in response to an increase in pressure caused by a force applied to the exterior wall 202, permitting the base component and the hardener component to both be expelled through the single outlet to facilitate mixing of the curable adhesive. The pressure increase due to an externally applied force on the compliant exterior wall 202 is thus transmitted to membrane 208 and the second volume 206 causing an increase in pressure within the second volume for rupturing the single frangible region 210. The membrane 208 may be made sufficiently thin to rupture once the hardener component has been substantially expelled from the second volume 206.

Figure 7:
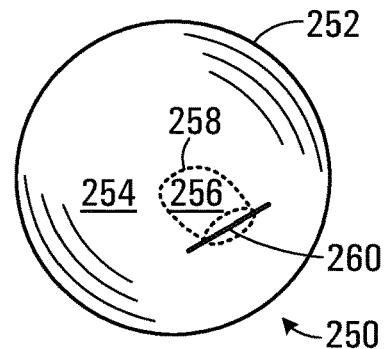
FIG. 7 is a perspective view of an apparatus for dispensing an adhesive in accordance with a further disclosed embodiment.

Referring to FIG. 7, an apparatus for dispensing an adhesive according to another disclosed embodiment is shown generally at 250. The apparatus 250 includes a compliant exterior wall 252 enclosing first and second volumes 254 and 256 separated by a membrane 258. In this embodiment the apparatus 250 includes a scored region 260 of the exterior wall 252, which acts as the frangible region. As shown in FIG. 7, the scored region 260 extends across the second volume 256 and into the first volume 254. Alternatively, the scored region 260 may be constrained to within the second volume to provide a single outlet when ruptured. The scored region may be implemented during manufacturing providing a frangible line extending across both the first and second volumes 254 and 256. Alternatively, a location of the scored region may be indicated by a marking printed on the compliant exterior wall 252 and the user may use a knife to cut through the first and second volumes 254 and 256 to allow the adhesive to be expelled.

Figure 8:
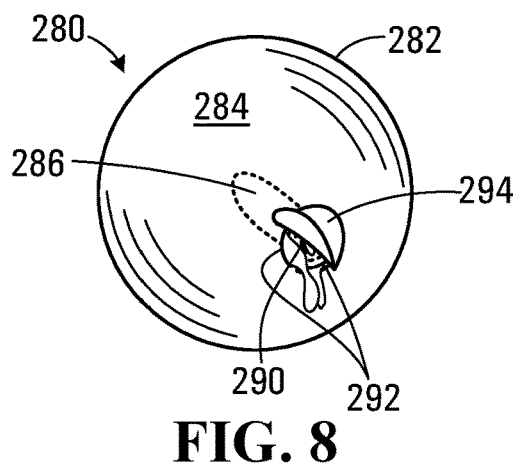
FIG. 8 is a perspective view of an apparatus for dispensing an adhesive in accordance with yet another disclosed embodiment.

In yet another embodiment shown in FIG. 8 at 280, the apparatus includes a compliant exterior wall 282 enclosing first and second volumes 284 and 286. The frangible region may be provided by forming openings 290 and 292 in the exterior wall 282 and providing a separate closure 294 for sealing the openings. The closure 294 is operably configured to be displaced by an increased pressure within first and second volumes 284 and 286 in response to a force being applied to the exterior wall 282. The closure 294 thus acts as the frangible region 110 as described above allowing the adhesive to be dispensed through the respective openings 290 and 292. The separate closure 294 may be fused or otherwise adhered to the exterior wall 282. The closure 294 may also be similarly implemented in the embodiment shown in FIG. 6 for closing an opening implemented in place of the depicted single frangible region 210.

In one embodiment the enclosures described above may be manufactured from a compliant sheet material using a rotary die process commonly used to fabricate products such as paintballs. The exterior wall 102 and membrane 108 may be formed and filled and the frangible region 110 may be simultaneously formed or added in a separate step. For example, the exterior wall 102 of the enclosure 100 may be scored with a blade to partially cut through the wall, thus selectively weakening the wall to promote rupturing. The score may be generally as described above in connection with the embodiment 250 shown in in FIG. 7. In another embodiment, the enclosure 100 may be formed and filled with openings left open and subsequently covered using a separate closure, such as shown in FIG. 8 at 294. The separate closure may cover a single outlet or multiple outlets. The closure may be fused onto the compliant exterior wall using a heating process or may be otherwise adhered to the wall.

While specific embodiments have been described and illustrated, such embodiments should be considered illustrative of the invention only and not as limiting the invention as construed in accordance with the accompanying claims.

What is claimed is:

1. An enclosure apparatus for dispensing an adhesive having a base component and a hardener component that when mixed produce a curable adhesive, the apparatus comprising:
a compliant exterior wall enclosing a first volume for containing the base component and a second volume for containing the hardener component, the first and second volumes being separated by a membrane attached to the exterior wall; and
a first frangible region formed in the exterior wall and in communication with the first volume and a second frangible region formed in the exterior wall and in communication with the second volume, the first and second frangible regions being operable to rupture to provide respective first and second outlets in response to an increase in pressure caused by a force applied to the exterior wall, the first and second outlets permitting respective portions of the base component and the hardener component to be expelled to facilitate mixing of the curable adhesive.

2. The apparatus of claim 1 wherein the membrane separating the first and second volumes surrounds the second frangible region and extends inwardly from the exterior wall, the second frangible region being operable, when ruptured, to provide an outlet for the second volume, and wherein the first frangible region is disposed outwardly on the exterior wall with respect to the second frangible region and is operable, when ruptured, to provide an outlet for the first volume.

3. The apparatus of claim 2 wherein the first frangible region is sized such that, when ruptured, an extent of the second outlet is limited to a portion of the exterior wall enclosing the second volume.

4. The apparatus of claim 2 wherein the second frangible region comprises a circular region and wherein the first frangible region has at least one generally annular shaped portion.

5. The apparatus of claim 1 wherein the first and second frangible regions each comprise a thinned region of the exterior wall.

6. The apparatus of claim 1 wherein the first and second frangible regions each comprise a scored region of the exterior wall.

7. The apparatus of claim 1 wherein the first and second frangible regions each comprise an opening in the exterior wall having a closure for sealing the opening, the closure being operable to be displaced in response to the force being applied to the exterior wall.

8. The apparatus of claim 1 wherein the first volume is substantially greater than the second volume generally in proportion to a mixing ratio for mixing the curable adhesive.

9. The apparatus of claim 8 wherein the first volume is sized to account for a portion of the base component that will remain when the base component and the hardener component have been expelled such that the base component and the hardener component are dispensed in proportions according to a pre-determined mixing ratio.

10. The apparatus of claim 1 wherein the exterior wall comprises one or more of a gelatin material, a polyvinyl alcohol material, a pullulan polysaccharide polymer material, and a metal film.

11. The apparatus of claim 1 wherein the exterior wall has a rounded shape.

12. The apparatus of claim 1 wherein the exterior wall has a substantially spherical shape.

13. The apparatus of claim 1 wherein the base component has a high plasticity suitable for use as a filler material when mixed to provide the curable adhesive.

14. The apparatus of claim 13 wherein the adhesive comprises a two-part filler material putty.

15. A method for dispensing an adhesive having a base component and a hardener component that when mixed produce a curable adhesive, the method comprising:
enclosing the adhesive within a compliant exterior wall having a first volume for containing the base component and a second volume for containing the hardener component, the first and second volumes being separated by a membrane attached to the exterior wall; and
causing a first frangible region formed in the exterior wall and in communication with the first volume and a second frangible region formed in the exterior wall and in communication with the second volume to rupture to provide respective first and second outlets in response to an increase in pressure caused by a force applied to the exterior wall, the first and second outlets permitting respective portions of the base component and the hardener component to be expelled to facilitate mixing of the curable adhesive.

16. An enclosure apparatus for dispensing an adhesive having a base component and a hardener component that when mixed produce a curable adhesive, the apparatus comprising:
a compliant exterior wall enclosing a first volume for containing the base component and a second volume for containing the hardener component, the first and second volumes being separated by a membrane attached to the exterior wall;
a first frangible region formed in the exterior wall and in communication with the first volume and a second frangible region formed in the exterior wall and in communication with the second volume, the first and second frangible regions being operable to rupture to provide respective first and second outlets in response to an increase in pressure caused by a force applied to the exterior wall, the first and second outlets permitting respective portions of the base component and the hardener component to be expelled to facilitate mixing of the curable adhesive; and
wherein the membrane separating the first and second volumes surrounds the second frangible region and extends inwardly from the exterior wall, the second frangible region being operable, when ruptured, to provide an outlet for the second volume, and wherein the first frangible region is disposed outwardly on the exterior wall with respect to the second frangible region and is operable, when ruptured, to provide an outlet for the first volume.

* * * * *